(12) United States Patent
O'Donnell

(10) Patent No.: US 7,587,474 B2
(45) Date of Patent: Sep. 8, 2009

(54) GROUND-BASED TRAVEL PORTAL

(75) Inventor: Mary E O'Donnell, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 812 days.

(21) Appl. No.: 11/184,710

(22) Filed: Jul. 19, 2005

(65) Prior Publication Data

US 2005/0256751 A1 Nov. 17, 2005

Related U.S. Application Data

(63) Continuation-in-part of application No. 10/103,032, filed on Mar. 21, 2002, now Pat. No. 6,993,554.

(60) Provisional application No. 60/316,443, filed on Aug. 31, 2001.

(51) Int. Cl.
*G06F 13/00* (2006.01)

(52) U.S. Cl. ............... 709/220; 709/228; 707/3; 705/6; 715/745; 715/747

(58) Field of Classification Search ......... 709/204–207, 709/220–222, 217–219, 228; 715/744–747, 715/751–759; 705/5, 6; 707/3
See application file for complete search history.

(56) References Cited

U.S. PATENT DOCUMENTS

| | | | |
|---|---|---|---|
| 5,948,040 A | 9/1999 | DeLorme et al. | |
| 6,199,099 B1 | 3/2001 | Gershman et al. | |
| 6,209,026 B1 | 3/2001 | Ran et al. | |
| 6,356,905 B1 | 3/2002 | Gershman et al. | |
| 6,397,072 B1 * | 5/2002 | Peters et al. | 455/456.3 |
| 6,401,085 B1 | 6/2002 | Gershman et al. | |
| 6,629,143 B1 | 9/2003 | Pang | |
| 6,757,712 B1 | 6/2004 | Bastian et al. | |
| 6,771,290 B1 | 8/2004 | Hoyle | |
| 6,804,718 B1 * | 10/2004 | Pang et al. | 709/226 |
| 7,353,182 B1 * | 4/2008 | Missinhoun et al. | 705/8 |
| 2002/0091779 A1 | 7/2002 | Donoho et al. | |
| 2002/0174205 A1 | 11/2002 | Nakashima | |
| 2003/0195811 A1 | 10/2003 | Hayes et al. | |
| 2004/0064591 A1 | 4/2004 | Noble | |

FOREIGN PATENT DOCUMENTS

EP 1 096 405 A2 5/2001

* cited by examiner

*Primary Examiner*—Kenneth R Coulter
(74) *Attorney, Agent, or Firm*—Harness, Dickey & Pierce, P.L.C.

(57) ABSTRACT

A ground-based travel planning portal is provided that is in communication with a counterpart in-transit portal so that the content presented through each portal is consistent to a traveler. The ground-based travel planning portal includes information for both business and leisure travel planning, in addition to other more general information. The traveler is able to identify and store a user-defined profile that includes personal traveling preferences such as airlines, hotels, rental cars, and personal content layout preferences which determines what content of the portal is presented to the traveler. Accordingly, the traveler has discretion to change and modify the content layout throughout the portal. Further, the user-defined profiles are shared across the ground-based portal and a counterpart in-transit portal so that the traveler accesses a common interface regardless of their travel status.

10 Claims, 7 Drawing Sheets

GROUND-BASED TRAVEL PORTAL

CROSS-REFERENCE TO RELATED APPLICATIONS

This application is based upon Provisional Patent Application, Ser. No. 60/316,443, entitled "Ground-Based Travel Portal," filed Aug. 31, 2001, the contents of which are incorporated herein by reference. This application is also a continuation-in-part of U.S. patent application Ser. No. 10/103,032 filed on Mar. 21, 2002 (now U.S. Pat. No. 6,993,554), the disclosure of which is incorporated herein by reference.

FIELD

The present disclosure relates generally to wide-area network systems and more particularly to a customizable ground-based portal that provides for business and leisure travel planning, and which is seamlessly integrated with a counterpart in-transit travel portal through user-defined profiles.

BACKGROUND

With the growing popularity of the Internet, and other wide-area networks, many business and leisure travelers are turning to online sources for their travel planning needs. The online sources are made available to the traveler in the form of a specialized "portal," which is a web site comprising content that is tailored to a specific user or group of users. Numerous travel planning portals are available for both business and leisure travelers across the Internet. Further, several portals exist that are tailored to specific needs of travelers such as disabled travelers, large group tours, and weekend travelers.

Generally, travel planning portals include a variety of information regarding a destination specified by the traveler such as flights and other modes of transportation, hotels, rental cars, and general information about the destination. For example, when a traveler searches "Austria" on a typical travel portal, a substantial amount of information may be made available, including maps, selections for booking flights, hotels, and cars, weather, and other general information regarding Austria as a destination. Further, various buttons may be presented that often include items such as health and safety, flight status, and airport information. The traveler tools selections, however, are not linked to the destination currently being searched by the traveler. If, for instance, the traveler chooses "Airport Information," information regarding airports in Austria is not presented; rather, the traveler typically must manually select an airport. The information specifically pertaining to Austria is therefore somewhat limited and, at best, not grouped and/or organized around a specific destination. Other travel planning portals known in the art also provide similar content in terms of planning either business or leisure travel.

Most travel planning portals include a personal profile, where the traveler can register and store numbers for frequent flyer, rental car and hotel programs, travel preferences, credit card numbers for booking reservations, and other personal contact information. These personal profiles, however, are not shared between the different travel portals and hence the traveler must register at each portal and re-enter their personal profile information. Moreover, the traveler is unable to modify the content and layout of the portal according to their personal preferences. For example, if the traveler does not want to view buttons for hotels and rental cars, known travel planning portals do not allow the traveler to modify the content of the portal to remove the hotel and rental car buttons. As a result, the traveler is forced to view portal content that is of no interest to them and therefore spends unnecessary time scanning portal content for the information that is of interest.

Travel planning portals of the known art are further limited to a ground-based use or limited in-transit use. For instance, the mobile traveler may wish to conduct travel planning not only before, but also during their travels to a particular destination or series of destinations. If the traveler were using an in-transit portal, it would be highly desirable to share the personal profiles of a traveler between the in-transit portal and the ground-based portal, thereby providing a seamless interface for the traveler whether they are traveling or not. In this respect, the traveler experiences a common and consistent interface regardless of the portal being accessed and their personal profiles are maintained throughout.

Accordingly, there remains a need in the art for a ground-based travel planning portal that allows the traveler to modify the content and layout thereof according to their personal preferences. Further, a ground-based travel planning portal is needed that is integrated with a counterpart in-transit travel portal to provide a common and seamless interface regardless of the travel status of the user.

SUMMARY

In one preferred form, the present disclosure provides a ground-based travel planning portal that is linked or integrated with a counterpart in-transit travel portal. The ground-based portal generally comprises two groups of web pages, namely, universal navigation pages and content pages. The universal navigation pages provide general administrative functions such as searching the site, contacting site staff, viewing and modifying account information, on-line help, and registration. The content pages provide travel planning content and are organized into specific business and leisure travel topic areas. The content pages are further "hybrid" in that travel planning content is offered along-side more general information. The content pages further comprise a virtual office wherein access to the company intranet of the traveler is available along with other network file transferring capabilities. Additional pages relating to news, weather, sports, entertainment, shopping, and culture are also provided. Further, the content can be limited through the use of filters to discourage travelers from viewing inappropriate material.

The ground-based portal of the present disclosure also allows the traveler to establish personal profile and content layout preference information, which are together referred to hereinafter as "user-defined profiles." The personal profile information includes such items as personal contact information, numbers for frequent flyer, rental car and hotel programs, and other preferences such as non-smoking accommodations and special meal requirements. The content layout preferences dictate generally how and what portal content is to be presented to the traveler. For example, if the traveler does not want to view information related to shopping, the shopping button can be turned off. The shopping button information is stored in the content layout preferences and when the traveler enters the ground-based portal during a future visit, the shopping button is no longer visible. Further, the traveler can turn on the shopping button if he/she later changes his/her mind and wishes to have the shopping button available once again on their portal.

Importantly, the personal profile and content layout preferences are coordinated between the ground-based portal of the present disclosure and an in-transit portal. Accordingly, the traveler accesses a common interface whether they are in-transit or on the ground. Moreover, the traveler does not have to create and save their personal preferences more than once. Generally, the user-defined profiles are stored in a central content management system that sends the information to both the ground-based portal of the present disclosure and an in-transit portal.

In order to coordinate the personal profiles and content layout preferences across multiple portals, the ground-based portal of the present disclosure requires user registration. Once registered, the traveler can then create and save user-defines profiles. In addition, the ground-based portal is preferably not fee based.

The ground-based portal of the present disclosure further comprises a button palette, which is a series of small color-keyed information side-bars available to the traveler that offer quick access, or links, to the desired information. The button palette is reusable, portable, and modular so that it can be moved and inserted into any main area page throughout the portal by the traveler. In this regard, travelers can further customize the layout and display of page content. The button palette is also stored for the traveler as a part of the user-defined profiles so that the layout is consistent across both the ground-based portal and an in-transit portal.

An additional feature of the ground-based travel portal is a search routine which finds and reserves the best bookings in hotels, cars flight, and package deals according to the search parameters of the traveler. The search routine also uses the personal profiles stored in the user-defined profiles as additional search parameters. After a search across the wide-area network, the search routine organizes and presents its search results to the traveler, and the traveler can then confirm any of the reservations that are desired.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description of various embodiments is merely exemplary in nature and is in no way intended to limit the disclosure, its application, or uses.

Figure 1:
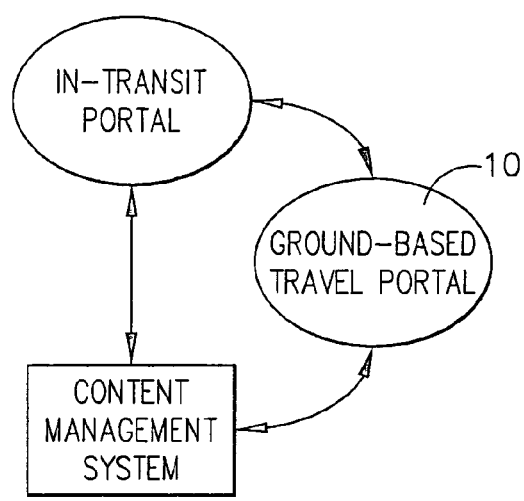
FIG. 1 is a simplified block diagram illustrating the ground-based portal in communication with an in-transit portal of the present disclosure.

Referring to FIG. 1, a preferred embodiment of a ground-based travel portal of the present disclosure is illustrated and generally indicated by reference numeral 10. Ground-based travel portal 10 is shown in communication with a counterpart in-transit portal, the latter of which is used by the traveler during transit such as a commercial airline flight. Ground-based travel portal 10 coordinates certain information regarding the traveler with the in-transit portal, as described in greater detail below, such that the traveler is presented with a consistent and seamless interface regardless of their travel status and which portal is being accessed. As shown, ground-based travel portal 10 also communicates with a central content management system that manages and stores portal content.

The ground-based travel portal 10 is organized into two primary groups of web pages, namely, navigation pages and content pages. The navigation pages provide administrative information and functions, and the content pages comprise the travel specific and more general content for the traveler to browse. The content pages are more specifically organized into particular business and leisure travel topic areas and are further "hybrid" in that travel-specific content is offered along-side more general information. Both the navigation pages and content pages are accessed through a home page of ground-based travel portal 10. The content provided through both the navigation pages and the content pages is generally referred to herein in its entirety as "travel planning content."

Home Navigation Content

Figure 2:
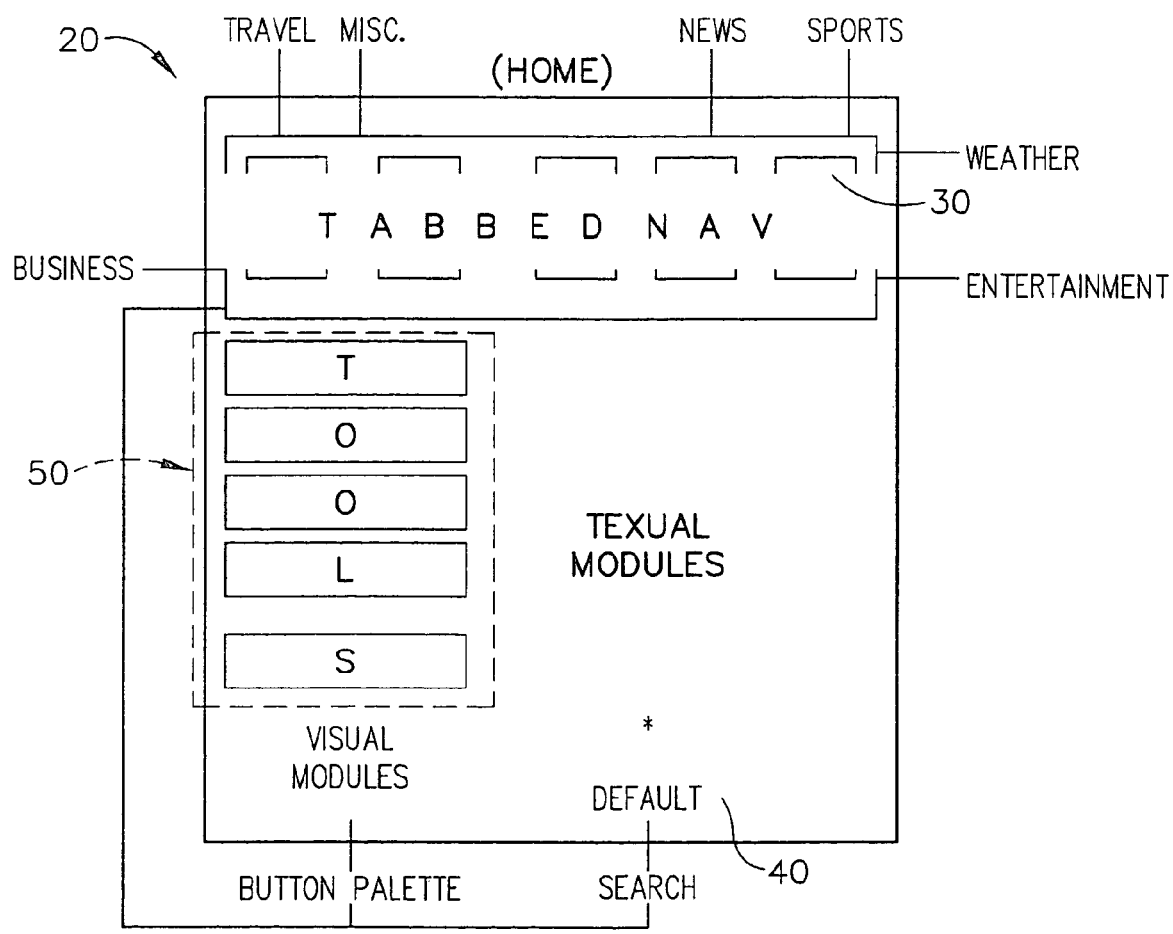
FIG. 2 is a layout of the home navigation content of the ground-based portal of the present disclosure.

Referring to FIG. 2, an exemplary home page of ground-based travel portal 10 is illustrated and generally indicated by reference numeral 20. Home page 20 is organized such that the main content pages are preferably presented using a tabbed navigation scheme 30. The tabbed navigation scheme 30 is present at the top of each page and is consistent from page-to-page throughout the portal. As a result, travelers can jump directly to any main content page regardless of their current location in the portal. Home page 20 further may comprise a search function 40 that is grouped as a part of the navigation pages. Travelers specify a particular search criteria or keyword in addition to specifying the depth of the search, such as content area only, the entire portal, or the entire wide-area network, for example the Internet. Advanced search capabilities, such as Boolean searches, are also provided within the search function 40.

Home page 20 further comprises a button palette 50, which is a vertically stacked palette of user-personalizable buttons that provide a quick and efficient one-button jump to pages, feature area, URLs, and other links. Although the home page 20 is designed with a default button palette 50, the traveler can add or remove buttons to and from the default palette. The button palette 50 is movable and can be dispersed throughout the portal to maintain a fresh look and to enhance traveler perception as to the up-to-date nature of the portal. Home page 20 is therefore highly customizable so that only the information that the traveler wants to see and the manner in which it is seen can be specified by the traveler.

In addition to the button palette, the traveler can customize the content and layout of pages throughout the ground-based travel portal. For example, the traveler can change the overall layout such as surrounding colors, content category positions, and persistence of visual modules and tools throughout the portal. Travelers can specify the content that appears by default on their home page by selecting a "modify" button on the top of each content page. Further, travelers can remove entire content pages by selecting an "X" button provided on the page. The personal content layout preferences of each individual traveler are then stored as a part of their user-defined profiles, and this information is shared across other portals such as an in-transit portal so that the traveler sees a consistent and seamless interface regardless of their travel status and the portal being accessed. Travelers can also return to the default system layout design by selecting a "reset to default" button provided within the home navigation content.

The personal preferences and content layout preferences, together referred to as user-defined profiles, are sent to a central content management system where the profiles are stored. The central content management system then sends the user-defined profiles to the ground-based travel portal and an in-transit portal upon request from the respective portal, and therefore, the interface remains consistent for the traveler regardless of the portal being accessed.

Ground-based travel portal 10 further comprises a search and book super agent or search routine, which finds and reserves the best bookings in hotels, cars, flights, and package deals according to the search parameters of the traveler. If, for example, a traveler is planning a trip to Austria and is interested in both airline tickets and hotels, the client simply enters the dates and destination into the portal, and the search routine returns the best selections to the client. If the client has stored personal preferences such as a non-smoking room and a vegetarian meal on flights, the search routine uses the preferences as additional parameters for its search. The search routine goes out across the wide-area network (e.g., the Internet) and accesses a variety of web sites to gather content that meets the dates, destination, and other personal preferences of the traveler. The search routine then organizes and presents the content to the traveler, and the traveler can then confirm any of the reservations that are desired. The traveler can further specify that search results are desired by the next day, or another future date, and the search routine then searches during this time to find the best possible selections for the traveler.

Navigation Pages

The navigation pages provide more general administrative functions such as searching the site, contacting site staff, viewing and modifying account information, on-line help, and registration.

Search: The search function allows the traveler to search only the ground-based portal or the entire wide-area network (e.g., the Internet) for the information that is desired. Searches are conducted using any of the search engines commonly known in the art.

Contact: The contact page allows the traveler to provide site staff with helpful information regarding their experience with the ground-based travel portal. Further, the contact page includes a contact mail form that is used to request information about the traveler such as their name, home address, phone number, and e-mail address.

My Account: The "my account" page provides access to personal profile information, where the traveler can view and edit their information accordingly. For example, the traveler can store numbers for frequent flyer, hotel and rental car programs, specific airline, hotel, or rental car preferences, and other personal travel preferences.

Help: The help page provides both on-line help through site content in addition to sending an e-mail to site staff to have a particular question answered. Further, contact can be made with site staff live, while the traveler is concurrently browsing the portal. The help content also explains how to use certain features of the portal such as navigation, menus, and downloading plug-ins.

Registration: The registration page is where travelers can join or sign in to use services offered by the ground-based travel portal of the present disclosure. As previously described, registration is required if user-defined profiles are to be saved for coordination with a counterpart in-transit portal.

Content Pages

The content pages comprise the business and leisure travel related information in addition to more general content that the traveler may wish to browse. The content pages are organized into categories including, but not limited to, business, travel, news, weather, sports, entertainment, shopping, culture, and miscellaneous. Any combination of the content pages can be presented as categories on the home navigation content, and the selection of content pages presented on the home page can further be customized by the traveler.

The following description highlights sample content for each of the content pages and is not intended to limit the pages to only the content shown; rather the navigation maps are only illustrative of the possible content that can be included as a part of each content page.

Figure 3:
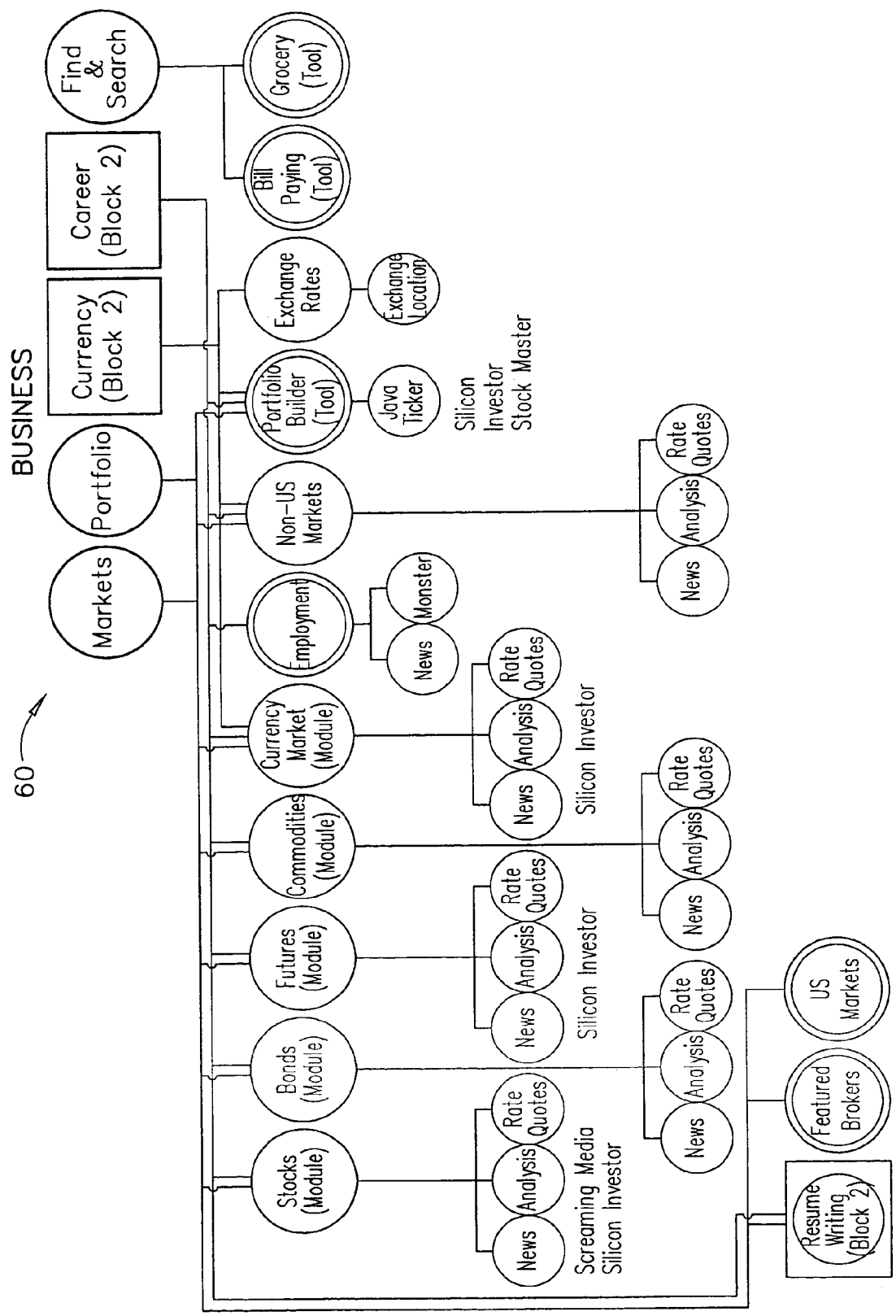
FIG. 3 is a navigation map for the business category of the ground-based portal of the present disclosure.

Referring to FIG. 3, a content navigation map for the business category is illustrated and generally indicated by reference numeral 60. The main business categories include "Markets," "Portfolio," "Currency," "Career," and "Find and Search." The business pages are intended to provide national and international breaking news and financial and stock exchange information. Also contemplated by the present disclosure but not shown in FIG. 3 is a "virtual office" button which connects the traveler to their respective corporate intranet and further provides for file sharing and other office related functions.

Figure 4:
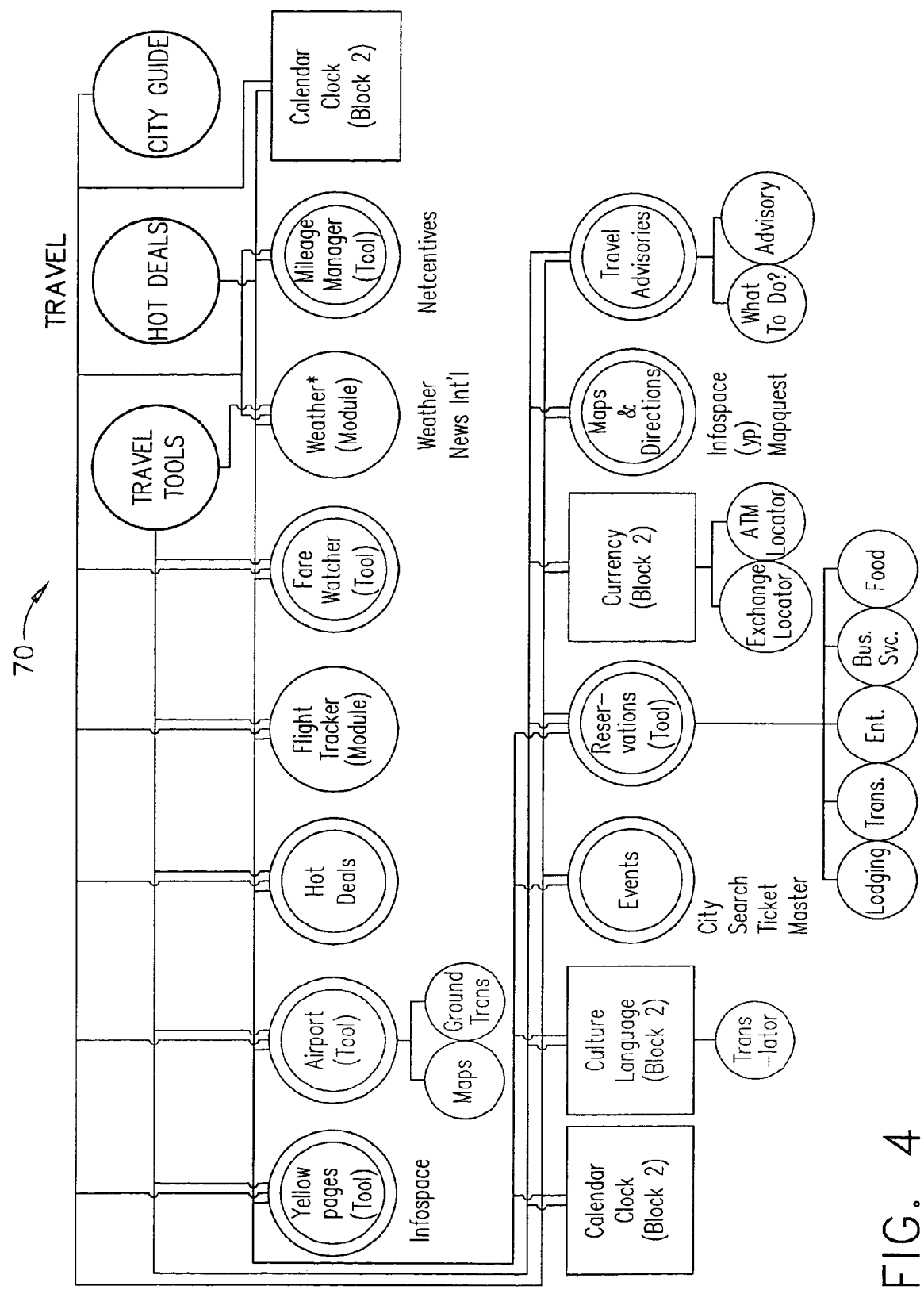
FIG. 4 is a navigation map for the travel category of the ground-based portal of the present disclosure.

Referring to FIG. 4, a content navigation map for the travel category is illustrated and generally indicated by reference numeral 70. As shown, the main travel content categories are "Travel Tools," "Hot Deals," and "City Guide." The travel category is directed to both business and leisure travelers, however, separate business and travel pages are available for the traveler. A business travel page is defined as a part of the travel category to provide, for example, airport information, travel tips and advisories, destination information, and links to other travel portals. A leisure travel page is also defined as a part of the travel category to provide, for example, access to bookings for all aspects of travel, airport information, ticket and flight information, travel tips and advisories, featured destinations, destination information, shopping, and links to other travel portals. Editorial travel content is also provided for both the business and leisure travel pages, which may include celebrity narratives regarding a particular travel destination.

Figure 5:
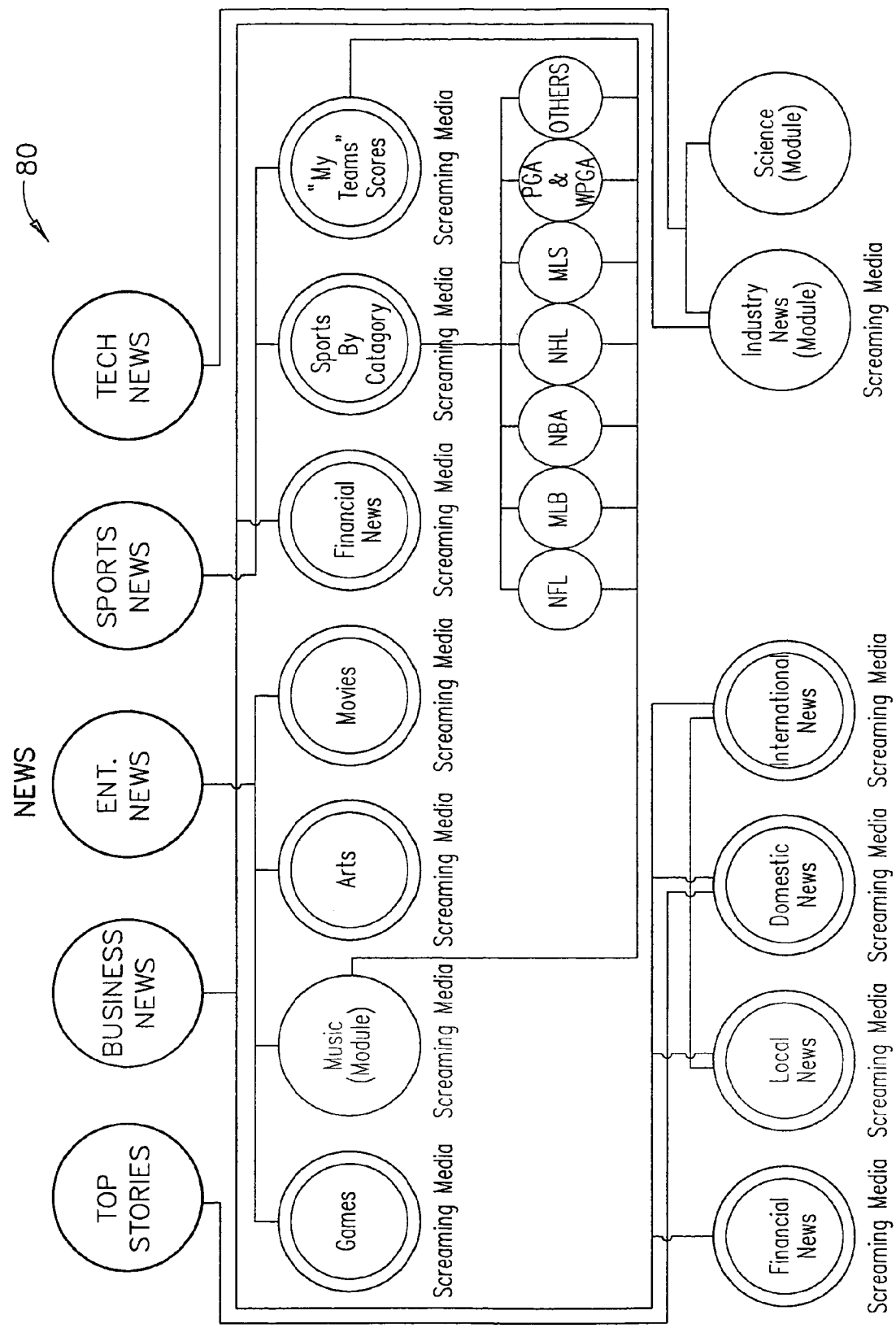
FIG. 5 is a navigation map for the news category of the ground-based portal of the present disclosure.
Figure 6:
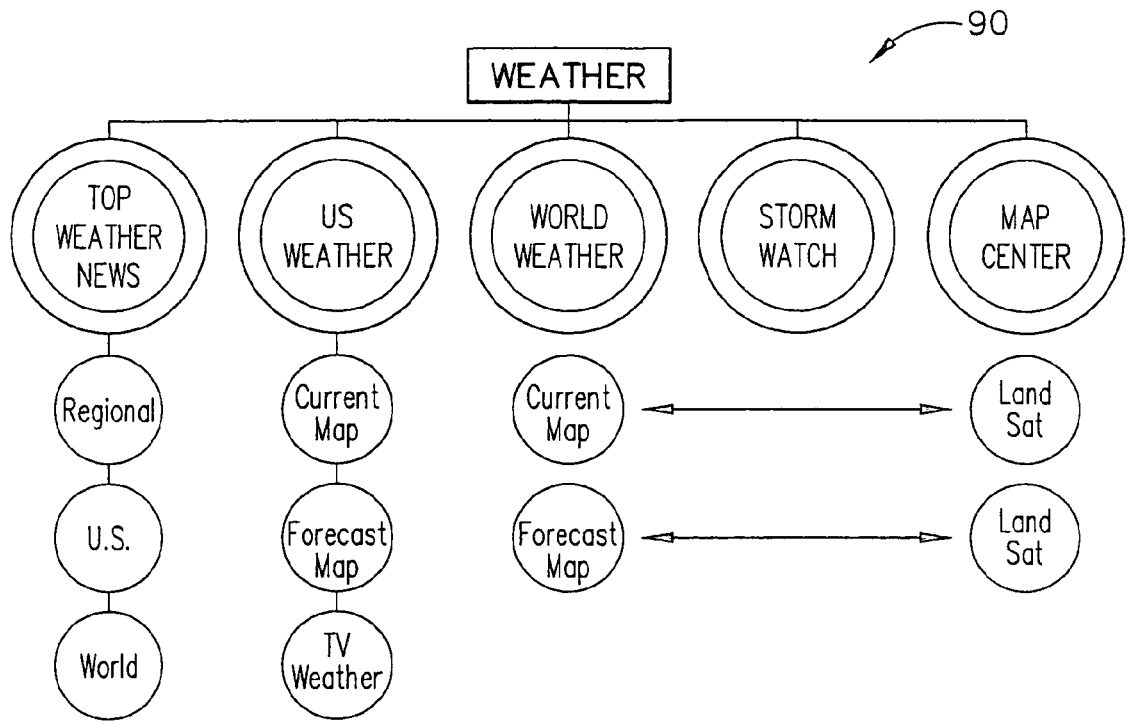
FIG. 6 is a navigation map for the weather category of the ground-based portal of the present disclosure.
Figure 7:
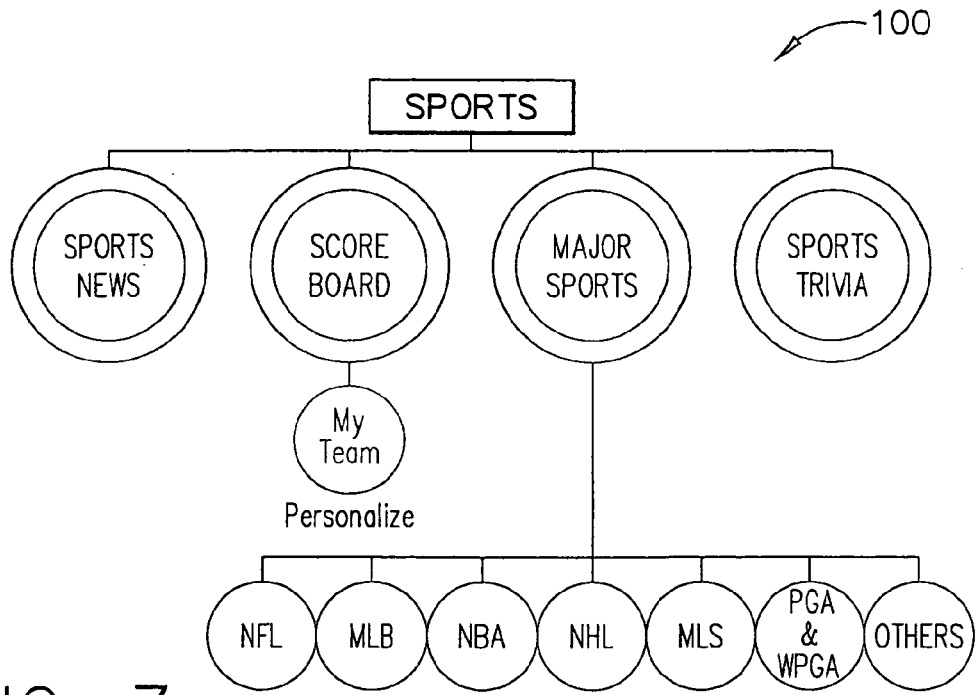
FIG. 7 is a navigation map for the sports category of the ground-based portal of the present disclosure.
Figure 8:
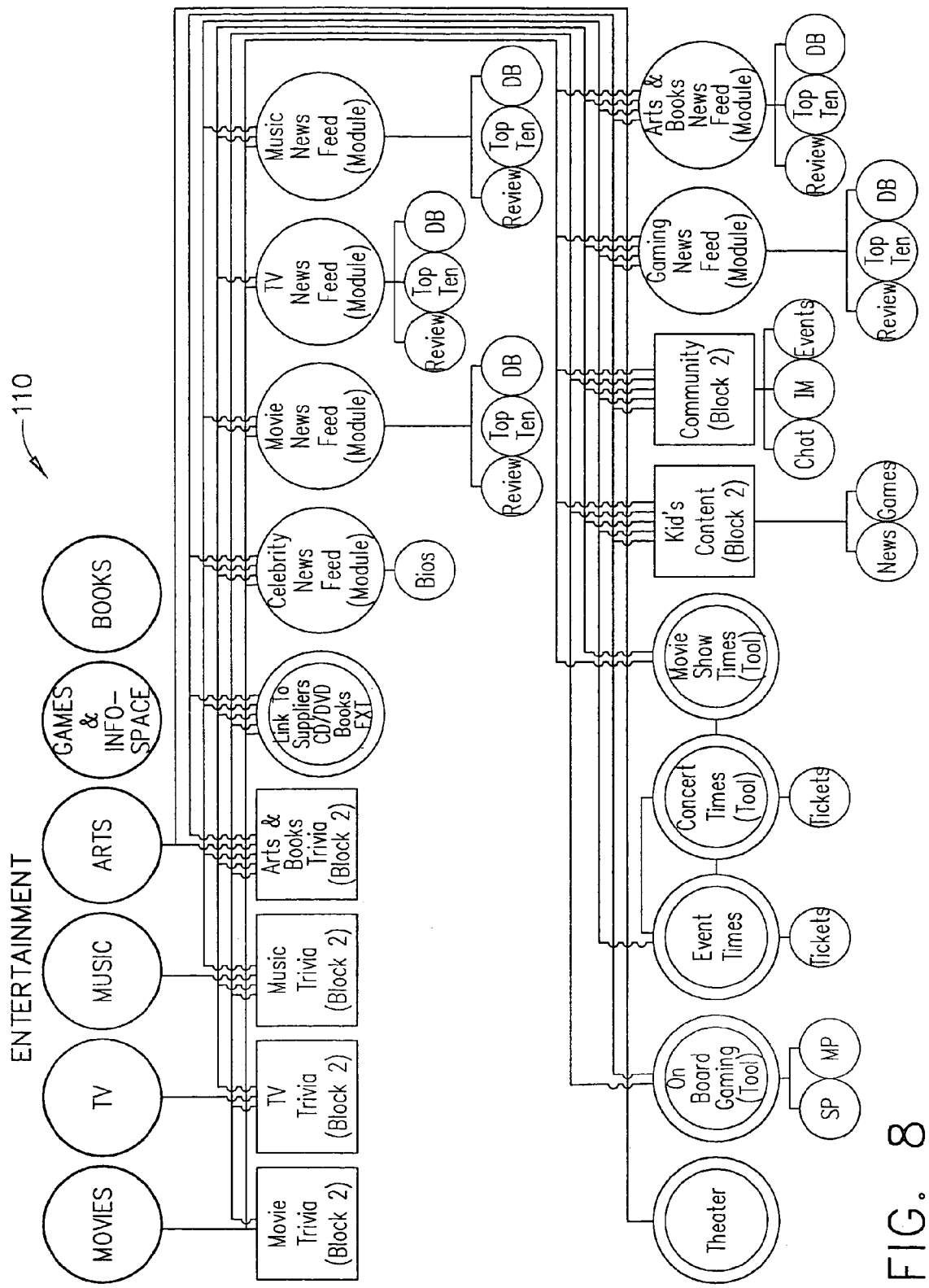
FIG. 8 is a navigation map for the entertainment category of the ground-based portal of the present disclosure.
Figure 9:
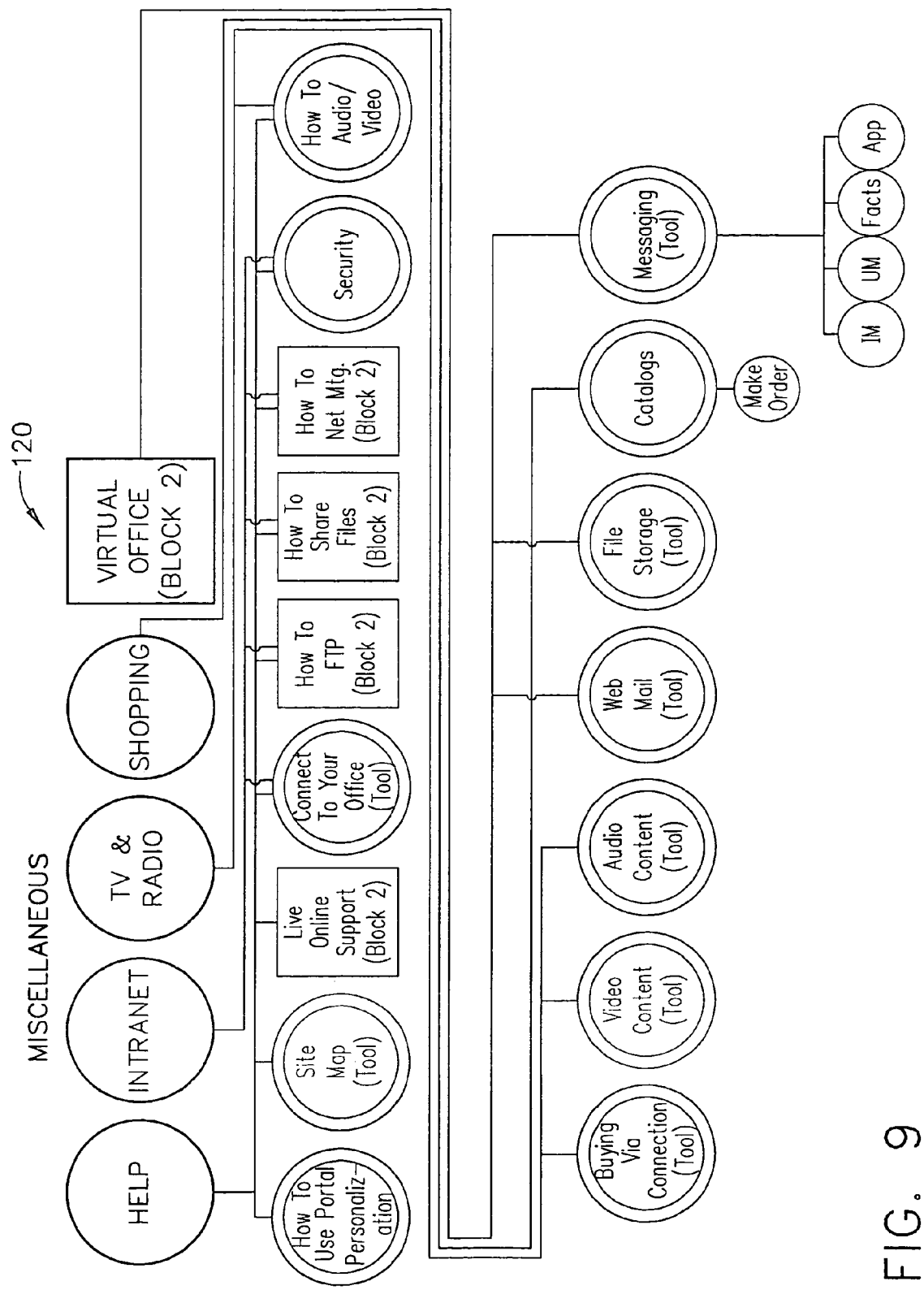
FIG. 9 is a navigation map for the miscellaneous category of the ground-based portal of the present disclosure.

Referring to FIG. 5, a content navigation map for the news category is illustrated and generally indicated by reference numeral 80. The news page provides current local, national, and international news categorized by user preference. Further, news related to a particular travel destination is specifically provided to the traveler. Both broadband and streaming media are contemplated for the news category to provide alternative content for the traveler.

FIGS. 6, 7, 8, and 9 show content navigation maps for the weather, sports, entertainment, and miscellaneous categories and are illustrated and generally indicated by reference numerals 90, 100, 110, and 120, respectively. Each of the maps illustrate the main content categories and the information to be provided to the traveler. As with other content pages, both broadband and streaming media are provided to present the respective information to the traveler. All of the content navigations maps are intended to illustrative rather than limiting the content and layout according to the present disclosure.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A ground-based wide-area network system embodied in hardware comprising:
    a plurality of user-defined profiles embodied in computer readable media;
    at least one link to an in-transit network portal;
    a module, embodied in computer readable media, interfacing with the in-transit network portal, for displaying a plurality of pages of information including:
        a universal navigation page and a plurality of content pages accessible from a home page, said content pages including both administrative information and travel related information;
        a search routine available from at least one of the content pages that selectively searches, identifies and presents travel planning information to the in-transit portal;
    wherein the user-defined profiles are shared between the ground-based wide-area network and the in-transit network portal to provide a consistent interface to a traveler including the travel planning information;
    a user configurable button palette having a plurality of buttons that allows the traveler to configure links to the travel planning information, the button palette being shared between the ground-based wide-area network and the in-transit network portal to provide a common interface to the traveler; and
    wherein the button palette is moveable between the content pages by the user.

2. The ground-based wide-area network system of claim 1, wherein the user-defined profiles further comprise:
    personal preferences of the traveler; and
    content layout preferences of the traveler, such that the traveler can customize the ground-based portal.

3. The ground-based wide-area network system of claim 1, wherein the travel planning information comprises:
    navigation pages providing administrative functions; and
    content pages providing travel related and general information to the traveler.

4. The ground-based wide-area network system of claim 3, wherein the navigation pages and the content pages are accessible through a home page.

5. The ground-based wide-area network system of claim 4, wherein the home page and the content pages comprise a tabbed navigation scheme, and the tabbed navigation scheme comprises buttons that are present throughout all of the content pages.

6. The ground-based wide-area network system of claim 1, wherein the traveler is able to book the travel reservations presented by the search routine.

7. The ground-based wide-area network system of claim 1, wherein the travel planning information further comprises a virtual office in which the traveler can access a corporate network to communicate electronic data.

8. A wide-area network system embodied in hardware comprising:
    at least one link to an in-transit network portal;
    a module, embodied in a computer readable media, interfacing with the in-transit network portal including:
        a virtual office portion which provides selectively modifiable travel planning content and a plurality of selectively modifiable user defined profiles that include content preferences;
    at least one navigation page, which includes at least one administrative function;
    at least one content page, which include at least one item of travel planning information; and
    the at least one navigation page and the at least one content page being accessible through a home page;
    a search routine that selectively searches, identifies and presents travel reservation information;
    a user configurable button palette having a plurality of buttons that allows the traveler to configure links to the travel planning information, the button palette being shared between the ground-based wide-area network and the in-transit network portal to provide a common interface to the traveler; and
    wherein the button palette is moveable between said content pages by the user.

9. The wide-area network system of claim 8, wherein the home page and the at least one content page comprise a tabbed navigation scheme, and the tabbed navigation scheme comprises buttons that are present on the at least one content page.

10. The wide-area network system of claim 8, wherein:
    the button palette enables the traveler to quickly link to the travel planning information, the button palette being shared between the wide-area network and the in-transit network portal to provide a common interface to the traveler.

* * * * *